Figure 1:
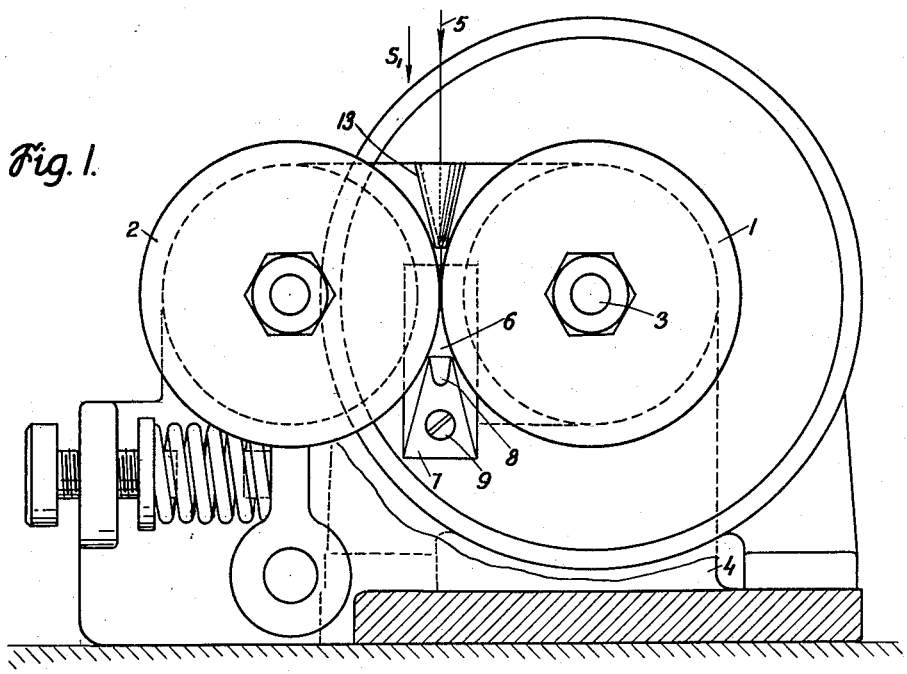

Dec. 24, 1963 M. PÁVEK ETAL 3,114,958
DEVICE FOR THE CRIMPING OF YARN
Filed Aug. 31, 1960

INVENTOR.
Miloslav Pávek
Jiří Havlas
BY
Michael S. Striker
Attorney

United States Patent Office 3,114,958
Patented Dec. 24, 1963

3,114,958
DEVICE FOR THE CRIMPING OF YARN
Miloslav Pávek and Jiří Havlas, Liberec, Czechoslovakia, assignors to Sdruzeni podniku textilniho strojirenstvi, Liberec, Czechoslovakia
Filed Aug. 31, 1960, Ser. No. 53,176
Claims priority, application Czechoslovakia Sept. 4, 1959
1 Claim. (Cl. 28—1)

The present invention relates to a device for the crimping of yarn by stuffing and deals more particularly with the crimping of artificial fibres.

A number of stuffing devices for crimping any kind of yarn, no matter whether natural or artificial, are known, in which the stuffing operation is effected by pressing the treated fibres into a stuffing chamber, the fibres leaving said chamber at the other end, if required after setting of the crimping produced in the chamber, whereupon the fibres are conveyed for further treatment.

The heretofore conventional and common feature of all known crimping devices for the treatment of such artificial fibres consists in that the stuffing chamber is placed in the direction of the longitudinal axis of the fibres fed into the chamber by means of feeding rollers, it being irrelevant whether such rollers are arranged above or below the stuffing chamber, the bottom of said chamber being substantially perpendicular to the direction of the supplied fibres. The crimping of fibres proceeds in such chambers in a rather non-uniform way, as the fibres introduced into the chamber are deposited on top of the layer of fibres which have been pressed into the chamber before. The device has to be constructed with great precision, because otherwise the fibres could be pushed out of the stuffing chamber through gaps between its sidewalls and the periphery of the stuffing rollers. Moreover, such devices do not offer any possibility of controlling the crimping operation itself.

The device embodying the invention aims at eliminating the drawbacks of known mechanisms and enables in a simple way the control of the crimping of the treated fibres.

According to the main feature of the present invention the stuffing mechanism comprises an antechamber, in which a tongue is arranged adjacent to the stuffing rollers. On an inclined surface of the tongue the fibres are crimped when entering the antechamber and are at the same time oriented by said surface and directed to a stuffing chamber, the longitudinal axis of which lies substantially in the direction in which the inclined surface of the tongue is inclined. The longitudinal axis of said chamber is therefore considerably inclined to the direction in which the fibres are introduced into the stuffing device, the chamber bearing on the circular surface of the stuffing rollers and of a front wall of the tongue so as to prevent any undesired escape of the crimped fibres between the front wall of the stuffing chamber and the adjacent surfaces. The crimping of the fibres may be controlled by using tongues with differing inclination of their inclined faces.

Figure 2:
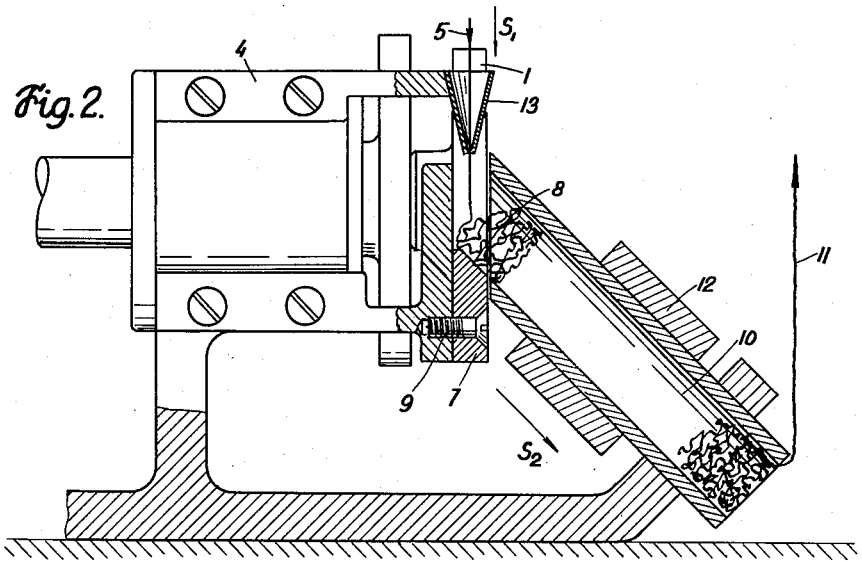

In order that the present invention may be readily carried into effect, it will now be described with reference to the accompanying drawing, wherein:

FIG. 1 is a diagrammatic representation in an elevational view of an embodiment of the stuffing rollers and the tongue of the present invention, the stuffing chamber being omitted for the sake of greater clarity; and FIG. 2 is a diagrammatic side view, partly in section, of the entire crimping device of the embodiment of FIG. 1, including the stuffing chamber.

The crimping arrangement comprises two stuffing rollers 1 and 2 rotating in opposite directions, which are mounted for rotation on pivots 3 secured to body 4. Closely adjacent the contact surfaces of the stuffing rollers 1 and 2 is a very small stuffing antechamber 6 provided in its lower portion with an exchangeable tongue 7 formed with a groove having a bottom oblique or inclined surface 8. The tongue 7 is exchangeably affixed to the front wall of the body 4, for instance by a screw 9. The front face of a stuffing chamber 10 bears against the flat portion of the stuffng rollers 1 and 2, as well as against the tongue 7, the longitudinal axis of said stuffing chamber 10 coinciding substantially with the inclination of the inclined surface 8 of the tongue 7. The crimped yarn 11 is withdrawn from the chamber 10 by means of a known, not illustrated, withdrawing mechanism.

The described device operates as follows:

The fibres 5, which are to be treated, are brought into the device by means of stuffing rollers 1 and 2 in the direction of the arrow $S_1$, said fibres entering the stuffing antechamber 6 directly behind the point of contact of said rollers and striking against the inclined surface 8 of the tongue 7, whereby the first stage of the crimping operation is carried out. The oblique or inclined surface 8 at the bottom of the groove in the tongue 7 at the same time directs the crimped fibres into the stuffing chamber 10, from which the crimped fibres 11 are withdrawn through an opening in the lower part of said chamber.

The stuffing can be carried out for instance by means of an electrically heated body 12. The introduction of the treated fibres 5 between the stuffing rollers 1 and 2 can be facilitated by means of a funnel 13.

As compared with other known crimping devices in which fibres are subjected to a stuffing operation, the arrangement according to the invention offers a further advantage therein that the crimping of fibres takes place immediately after the fibres are introduced between the stuffing rollers 1 and 2 on the minimum length of the fibres, that is, at the moment when the free end of the fibre contacts the inclined surface 8 of the tongue 7, it being therefore unnecessary to wait until the entire stuffing chamber is filled, which in the conventional devices was the cause of an undesirable waste of the treated material.

In addition to the fact that the distance between the point of contact of both stuffing rollers and the inclined surface 8 of the tongue 7 is exceedingly small, a high degree of uniformity in the crimping of fibres is achieved at the same time. The crimping of the fibres can be altered by exchanging the tongue 7 for another with a differently inclined surface 8. Even if the manufacturing tolerances are chosen such as to be easily kept and if the stuffing chamber 10 abuts but lightly against the flat surfaces of the stuffing rollers 1 and 2 and against the tongue 7, the fibres do not at all escape from the chamber between the contact faces.

I claim:

A device for crimping yarn and fibres, including an antechamber, comprising at least one pair of stuffing rollers, each having a substantially flat face and a tongue adjacent said stuffing rollers, said tongue having a front wall adjacent said stuffing rollers, an oblique surface on said tongue adapted to be struck by the fibres fed into the device by said stuffing rollers for the purpose of crimping the fibres; and a stuffing chamber arranged adjacent said stuffing rollers, the longitudinal axis of said stuffing chamber coinciding substantially with the direction of inclination of the oblique surface of said tongue, and being inclined with respect to the direction in which the fibres are introduced into said device, said stuffing chamber bearing on the flat faces of said stuffing rollers and on the front wall of said tongue.

References Cited in the file of this patent

UNITED STATES PATENTS

| | | |
|---|---|---|
| 2,647,285 | Pfau | Aug. 4, 1953 |
| 2,854,701 | Rainard | Oct. 7, 1958 |
| 2,865,080 | Hentschel | Dec. 23, 1958 |
| 2,914,810 | Robinson et al. | Dec. 1, 1959 |

FOREIGN PATENTS

| | | |
|---|---|---|
| 219,965 | Australia | Jan. 22, 1959 |